(12) United States Patent
Shahi et al.

(10) Patent No.: US 8,049,456 B2
(45) Date of Patent: Nov. 1, 2011

(54) DYNAMOELECTRIC MACHINE ASSEMBLIES OPERABLE WITH SERIAL COMMUNICATION SIGNALS AND PWM CONTROL SIGNALS

(75) Inventors: Prakash B. Shahi, St. Louis, MO (US); Arthur E. Woodward, Manchester, MO (US); Mark E. Carrier, Wildwood, MO (US)

(73) Assignee: Nidec Motor Corporation, St. Louis, MO (US)

( * ) Notice: Subject to any disclaimer, the term of this patent is extended or adjusted under 35 U.S.C. 154(b) by 535 days.

(21) Appl. No.: 12/201,829

(22) Filed: Aug. 29, 2008

(65) Prior Publication Data

US 2010/0052592 A1    Mar. 4, 2010

(51) Int. Cl.
 *G05B 11/28* (2006.01)
(52) U.S. Cl. .................. 318/599; 318/42; 318/811
(58) Field of Classification Search .......... 318/42, 318/599, 811, 400.01, 727, 779, 799, 560; 388/904; 341/100; 700/276; 340/12.15
See application file for complete search history.

(56) References Cited

U.S. PATENT DOCUMENTS

| | | | |
|---|---|---|---|
| 4,811,897 A * | 3/1989 | Kobayashi et al. | 236/49.3 |
| 5,426,355 A * | 6/1995 | Zweighaft | 318/364 |
| 5,592,058 A * | 1/1997 | Archer et al. | 318/400.09 |
| 5,760,563 A * | 6/1998 | Bennett et al. | 318/641 |
| 6,784,634 B2 * | 8/2004 | Sweo | 318/727 |
| 7,106,019 B2 * | 9/2006 | Becerra et al. | 318/400.01 |
| 7,230,400 B1 * | 6/2007 | Dufner et al. | 318/400.1 |
| 7,821,218 B2 * | 10/2010 | Butler et al. | 318/461 |
| 2005/0267659 A1 * | 12/2005 | Sunaga et al. | 701/36 |

OTHER PUBLICATIONS

Christopher Mohalley; ECM 3.0 Motor Troubleshooting; Dec. 20, 2007; pp. 1-3.

* cited by examiner

*Primary Examiner* — Walter Benson
*Assistant Examiner* — Antony M Paul
(74) *Attorney, Agent, or Firm* — Hovey Williams LLP

(57) ABSTRACT

A dynamoelectric machine assembly for connection to a system controller. The assembly includes at least one input contact for receiving a control signal from the system controller and a processor coupled to the input contact. The processor is configured to operate the assembly in a pulse width modulation (PWM) mode when the control signal is a PWM control signal and to operate the assembly in a serial mode when the control signal is a serial communication signal.

12 Claims, 7 Drawing Sheets

DYNAMOELECTRIC MACHINE ASSEMBLIES OPERABLE WITH SERIAL COMMUNICATION SIGNALS AND PWM CONTROL SIGNALS

FIELD

The present disclosure relates to dynamoelectric machine assemblies, including electric motors and generators.

BACKGROUND

This section provides background information related to the present disclosure which is not necessarily prior art.

Electric motor assemblies commonly include a motor having a shaft for driving rotation of a component coupled to the shaft, and a motor controller, typically including a processor, for controlling operation of the motor. The motor controller may include one or more memory devices, including volatile and nonvolatile memory devices. The motor controller often uses these memory devices to store and retrieve software and data as necessary for controlling operation of the motor.

Electric motor assemblies are frequently used in systems governed by system controllers. For these applications, an electric motor assembly is typically configured to receive either a pulse width modulation (PWM) control signal or a serial communication signal from the system controller.

When a motor is controlled by a pulse width modulation (PWM) control signal, the system controller provides a signal having a constant frequency but a variable on-time and off-time. The ratio of the on-time to the sum of the on-time and off-time is the duty cycle of the PWM signal, and is often expressed as a percentage. The motor assembly, and in particular the motor controller, are typically configured to perform a certain way depending on the duty cycle of the PWM control signal.

Unlike non-communicating PWM control signals, serial communication signals can transmit a theoretically limitless amount of information to a motor assembly, including operating parameters, commands, etc. Serial communication is a bit-based communication between two or more devices and is governed by a predetermined protocol. Generally, anything that can be represented by data bits can be communicated via serial communication.

SUMMARY

This section provides a general summary of the disclosure, and is not a comprehensive disclosure of its full scope or all of its features.

According to one aspect of the present disclosure, a dynamoelectric machine assembly for connection to a system controller includes an input contact for receiving a control signal from the system controller and a processor coupled to the input contact. The processor is configured to operate the assembly in a pulse width modulation (PWM) mode when the control signal is a PWM control signal and to operate the assembly in a serial mode when the control signal is a serial communication signal.

According to another aspect of the present disclosure, a dynamoelectric machine assembly for connection to a system controller includes at least one input for receiving a control signal from the system controller and a processor coupled to the input to receive the control signal. The processor is configured to determine if the control signal is a PWM signal or a serial communication signal, and to operate the assembly in a PWM mode when the control signal is a PWM signal and to operate the assembly in a serial mode when the control signal is a serial communication signal.

According to yet another aspect of the present disclosure, a dynamoelectric machine assembly for connection to a system controller includes a plurality of operating parameters for operation of the assembly stored in a memory device. The assembly also includes at least one input for receiving a PWM control signal from the system controller and a serial communication signal from the system controller. The assembly further includes a processor coupled to the input to receive the serial communication signal and the PWM control signal. The processor is configured to change the plurality of operating parameters stored in the memory device in response to the serial communication signal. The processor is also configured to operate the assembly in accordance with the PWM control signal and the plurality of operating parameters stored in the memory device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
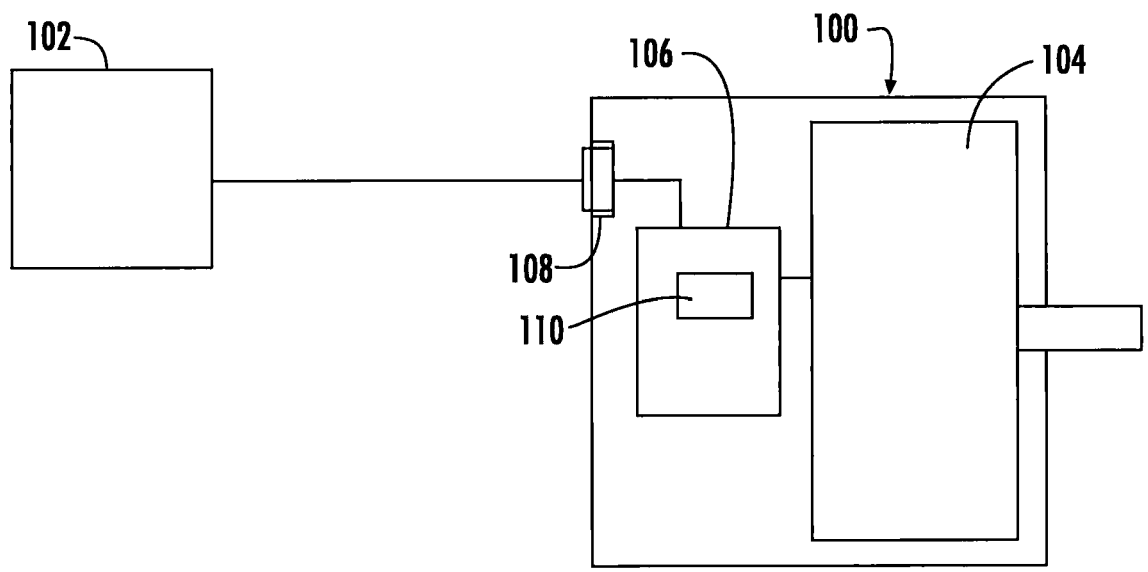
FIG. 1 is a block diagram of a system including a dynamoelectric machine assembly and a system controller according to one or more aspects of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

According to one aspect of the present disclosure, a dynamoelectric machine assembly for connection to a system controller includes an input contact for receiving a control signal from the system controller and a processor coupled to the input contact. The processor is configured to operate the assembly in a pulse width modulation (PWM) mode when the control signal is a PWM control signal and to operate the assembly in a serial mode when the control signal is a serial communication signal.

According to another aspect of the present disclosure, a dynamoelectric machine assembly for connection to a system controller includes at least one input for receiving a control signal from the system controller and a processor coupled to the input to receive the control signal. The processor is configured to determine if the control signal is a PWM signal or a serial communication signal, and to operate the assembly in a PWM mode when the control signal is a PWM signal and to operate the assembly in a serial mode when the control signal is a serial communication signal According to yet another aspect of the present disclosure, a dynamoelectric machine assembly for connection to a system controller includes a plurality of operating parameters for operation of the assembly stored in a memory device. The assembly also includes at least one input for receiving a PWM control signal from the system controller and a serial communication signal from the system controller. The assembly further includes a processor coupled to the input to receive the serial communication signal and the PWM control signal. The processor is configured to change the plurality of operating parameters stored in the memory device in response to the serial communication signal. The processor is also configured to operate the assembly in accordance with the PWM control signal and the plurality of operating parameters stored in the memory device.

Examples of dynamoelectric machine assemblies embodying one or more of the aspects described above will now be described with reference to FIGS. 1-6. FIGS. 5A and 5B, each of which is a portion of a circuit diagram of connections to a processor suitable for use in a dynamoelectric machine assembly, will be collectively referred to herein as FIG. 5.

A dynamoelectric machine assembly according to one example of the present disclosure is illustrated in FIG. 1 and indicated generally by reference numeral 100. As shown in FIG. 1, the machine assembly is connectable to a system controller 102 and includes a motor 104, a processor 106 and an input 108. The processor 106 is coupled to the motor 104 to control operation of the assembly 100 in general and the motor 104 in particular. The input 108, which is coupled to receive a control signal from the system controller 102 (via wire(s) or wirelessly), is coupled to the processor 106. The processor 106 is configured to operate the assembly 100 in a pulse width modulation (PWM) mode when the control signal is a PWM control signal. The processor 106 is further configured to operate the assembly 100 in a serial mode when the control signal is a serial communication signal. The 106 processor may be, e.g., a digital signal processor (DSP), a microprocessor, a microcontroller, etc.

The assembly 100 also includes a memory device 110 operable to store information such as software, operating parameters and/or other data. In the embodiment of FIG. 1, the memory device 110 is an on-board memory device within the processor 106. Alternatively, or additionally, external memory can be employed. The memory device 110 may be, e.g., flash memory, electrically erasable programmable read-only memory (EEPROM), random access memory (RAM), or any other suitable type of memory.

In operation, the assembly 100 receives a control signal from the system controller 102 at the input 108. Depending on the type of system controller 102 and/or its configuration, the control signal may be a PWM control signal or a serial communication signal. The system controller 102 may also be capable of providing both PWM signals and serial communication signals. The processor 106 is configured to determine whether the control signal received at the input 108 is a PWM signal or a serial communication signal.

If the received control signal is a PWM control signal, the processor 106 operates the motor 104 in a PWM mode. As discussed above, the duty cycle of the PWM signal represents a percentage. The processor 106 can be configured to use this percentage in numerous ways. For example, the assembly 100 may be configured to operate in a speed control PWM mode. The duty cycle of the PWM control signal is used by the processor 106 to determine at what speed to operate the motor 104, i.e. the duty cycle represents what percentage of a maximum speed the motor 104 should be operated at. Alternatively, the assembly 100 may be configured to operate in an airflow control mode (duty cycle representing a percentage of a maximum airflow), a torque control mode (duty cycle representing a percentage of a maximum torque), etc.

Operating parameters for the assembly 100 can be stored in the memory device 110. The operating parameters include parameters related to the type of PWM mode control with which the assembly 100 should be operated, how to operate the assembly 100 in such a mode, the relevant maximum values for such mode (i.e., airflow, speed, torque, etc.), and so forth. Other operating parameters can include the direction of rotation of the motor 104, various motor coefficients, the ramp rate of the motor 104, the PWM frequency range, what data to output (as further explained below), minimum and maximum duty cycles, and any other necessary or desired operating parameters. The processor 106 is configured to use these operating parameters to operate the assembly 100 in response to the PWM control signal.

When the control signal is a serial communication signal, the processor 106 operates the motor 104 in a serial mode. In the serial mode, the control signal communicates the desired operation to the motor 104. The serial communication signal may include the operating parameters for the motor 104. The serial communication signal can include, for example, which direction to operate the motor 104, system coefficients, ramp rate, speed, airflow or torque requirements, and any other necessary or desired operating parameters. Additionally, the serial communication signal can instruct the assembly 100 to begin, or cease, operation. Thus, the system controller 102 can send the operating parameters and the command to begin operation, and may cease sending further control signals until some change is desired. Additionally, operating parameters, including whether to operate in a speed control, torque control or airflow control mode, can be changed by the system controller 102 at any time, including while operating, by simply transmitting such changes in the serial communication signal.

In contrast, under operating in the PWM control mode, the system controller 102 continually sends the PWM control signal to the assembly 100 to keep the assembly 100 running. Additionally, the assembly 100 can generally only operate in PWM mode according to the operating parameters stored in the memory device 110. Thus, a change in operating parameters for PWM mode operation requires the new, additional, or replacement operating parameters to first be stored in the memory device 110. The processor 106 is configured to cause such a change to the operating parameters when it receives a serial communication signal including an instruction to make such a change. Thus, operating parameters for PWM mode operation may be updated, whether by addition, change, or deletion, in response to a serial communication signal.

Figure 2:
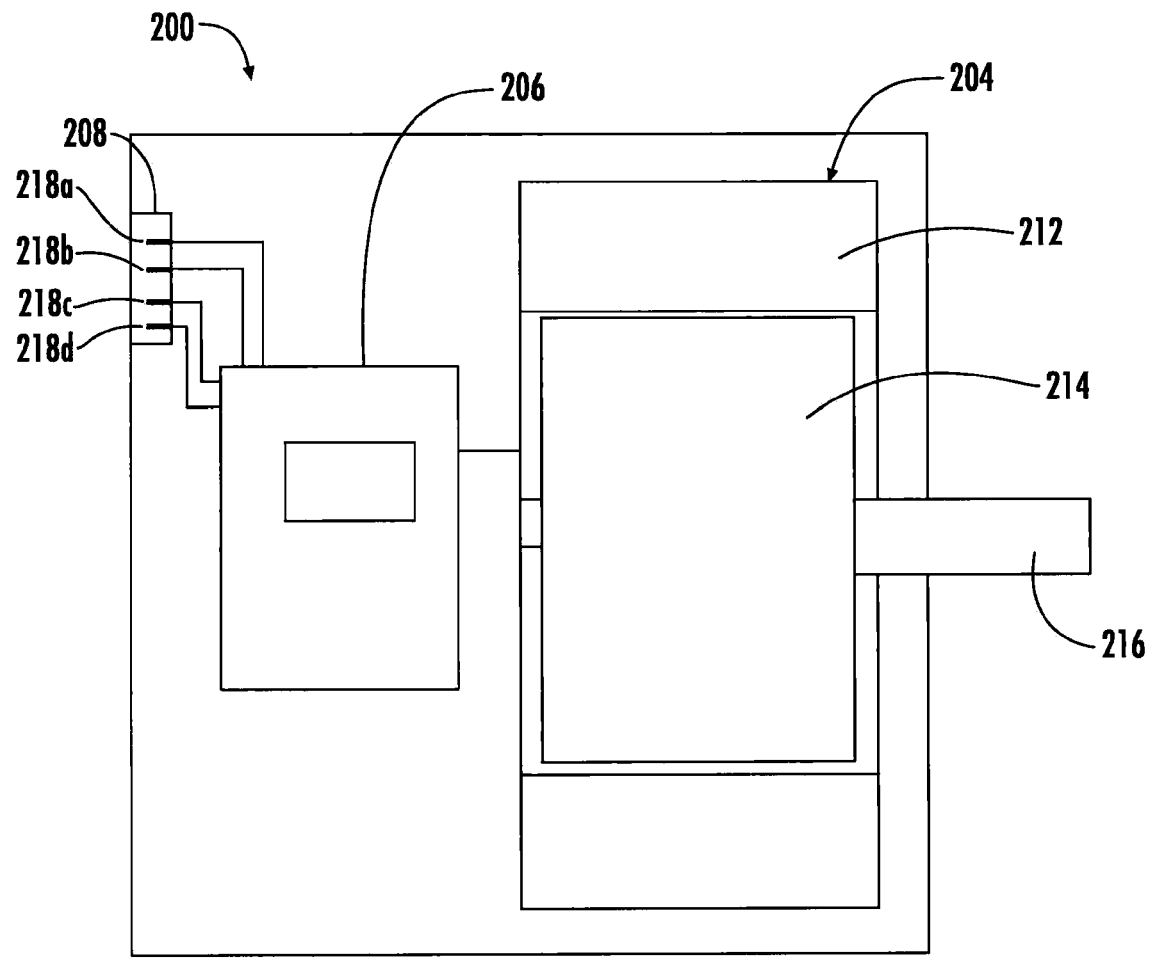
FIG. 2 is a block diagram of a dynamoelectric machine assembly including an input and a processor having a memory device according to one or more aspects of the present disclosure.

Another embodiment of a dynamoelectric machine assembly 200 for connection to a system controller is shown in FIG. 2. The assembly 200 includes a motor 204, a processor 206 and an input 208. The motor 204 includes a stator 212, a rotor 214 and a rotor shaft 216. The processor 206 is coupled to the motor 204 to control operation of the assembly 200 in general and the motor 204 in particular. The input 208, which is coupled to receive a control signal from the system controller, is coupled to the processer 206. The processor 206 is configured to operate the assembly 200 in a pulse width modulation (PWM) mode when the control signal is a PWM control signal. The processor 206 is further configured to operate the assembly 200 in a serial mode when the control signal is a serial communication signal. Although the motor 202 is illustrated as an inner rotor motor, the motor may alternatively be an outer rotor motor.

In the embodiment of FIG. 2, the input 208 includes four contacts 218a-218d, collectively referred to by reference numeral 218. Each of the contacts 218 is coupled to the processor 206 and can be coupled to an external device, such as a system controller. Alternatively, one or more of the contacts 218 can be coupled to, e.g., an antenna to facilitate wireless communication with an external device. The contacts 218 can be part of a connector for connection to an external wire or cable having a mating connector. The contacts 218 may be used for input and/or output. Thus, the contacts 218 may receive one or more signals and/or power inputs from an external source, including a system controller. The contacts 218 may also serve to couple one or more signals, return (or ground), and/or power outputs from the assembly 200 to an external source, including a system controller. Although the contacts 218 are illustrated as pins, the contacts 218 may be bullets, terminals, female connectors, or any other suitable contact. In some embodiments, the input is a four-pin input such as a four-pin connector.

The processor 206 is configured to send a data output signal from the assembly 200 to an external device to which it is connected, such as a system controller. The processor 206 is configured to send a serial communication output signal when the assembly 200 is being operated in the serial mode. The processor 206 is also configured to send a non-serial communication output signal when the assembly 200 is being operated in the PWM mode. Alternatively, the processor 206 may be configured to output a serial communication output signal when the assembly 200 is operating in the PWM mode, and/or a non-serial communication output signal (e.g., a PWM or variable frequency signal) when the assembly 200 is operating in the serial mode.

Typically, when operating in the serial mode, a serial output signal is employed. The serial output signal can include any data that can be serially transmitted from the assembly 200. This serial communication output signal may include feedback and confirmation data about the assembly. For example, the processor 206 may transmit a serial communication output signal confirming receipt of a control signal, commencement of assembly 200 operation, etc. The processor 206 may also transmit a serial communication output signal indicating current speed, torque, airflow, etc. as well as other data (including message confirmations, etc.).

When the assembly 200 is operating in the PWM mode, the output signal will typically be a PWM output signal or a variable frequency output signal. The processor can be configured to transmit an output signal representing a single parameter at any given time. The output signal may represent, for example, a speed, airflow, or torque value. The processor 206 may also be configured to transmit a certain output signal for a certain condition. For example, a PWM output signal with a 50% duty cycle may indicate that the assembly is operating at 50% of the maximum speed. The same speed may alternatively be represented by a variable frequency output signal having, e.g., a 1 kHz frequency. The processor 206 may additionally or alternatively transmit an output signal to trigger a visible or audible indicator, such as a blinking light or an audible beeping. The processor may generate the output signal by turning a transmit pin on and off one or more times, or in any other suitable manner.

Regardless of whether a serial communication output signal or a non-serial communication output signal is employed, the output signal can be provided via the same line or contact used for receiving control signals from the system controller (e.g., over a bi-directional line) or via a separate line or contact (e.g., a dedicated output line).

Figure 3:
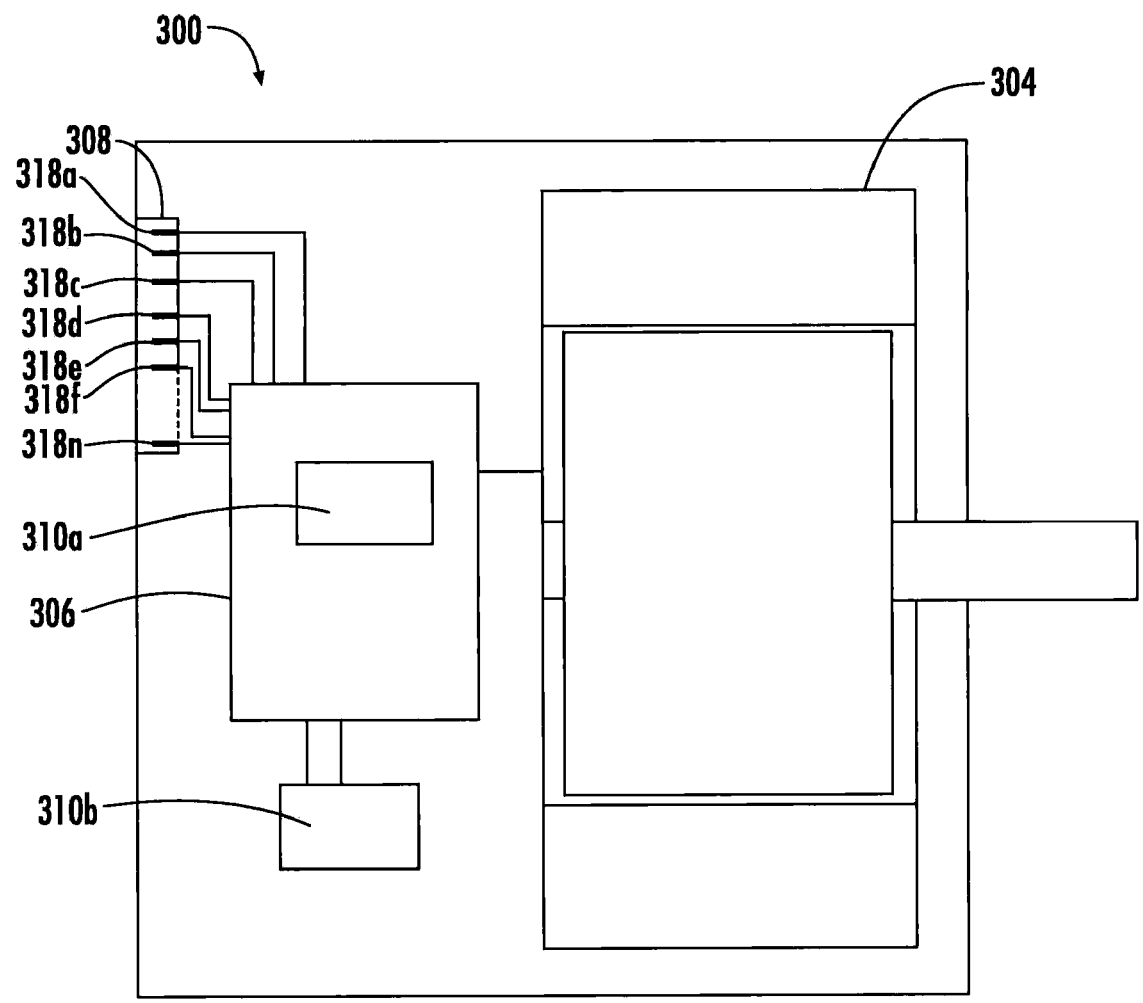
FIG. 3 is a block diagram of a dynamoelectric machine assembly including an input and a processor and a memory device external to the processor according to one or more aspects of the present disclosure.

Another embodiment of a dynamoelectric machine assembly 300 for connection to a system controller is shown in FIG. 3. The assembly 300 includes a motor 304, a processor 306 and an input 308. The processor 306 is coupled to the motor 304 to control operation of the assembly 300 in general and the motor 304 in particular. The input 308, which is coupled for receiving a control signal from the system controller, is coupled to the processer 306. The processor 306 is configured to operate the assembly 300 in a pulse width modulation (PWM) mode when the control signal is a PWM control signal. The processor 306 is further configured to operate the assembly 300 in a serial mode when the control signal is a serial communication signal.

The assembly 300 includes a memory device 310a operable to store information such as operating parameters, software and/or other data. The memory device 310 is an on-board memory device included within the processor 306. The assembly 300 also includes an external memory device 310b. Thus, it should be understood that in various embodiments of the present disclosure, on-board memory devices and/or external memory devices may be employed.

In the embodiment of FIG. 3, the input 308 includes n-contacts 318a-318n, collectively referred to by reference numeral 318. Each of the contacts 318 in FIG. 3 is coupled to the processor 306 and can be coupled to an external device, such as a system controller. However, the contacts 318 need not all connect to the processor 306 and in some embodiments one or more contacts 318 are coupled to something other than the processor 306. The contacts 318 can be part of a connector, such as an n-pin connector, for connection to an external wire or cable having a mating connector. The contacts 318 may be used for input and/or output. Thus, the contacts 318 may receive one or more signals and/or power inputs from one or more external sources, including a system controller. The contacts 318 may also serve to couple one or more signals, return (or ground), and/or power outputs from the assembly 300 to one or more external sources, including a system controller. Although the contacts 318 are illustrated as pins, the contacts 318 may be bullets, terminals, female connectors, or any other suitable contact.

In some embodiments, the motor may be a ⅓, ½, ¾, or 1 horsepower motor. Such motors can provide a maximum torque of 20 lb-in, 30 lb-in, 45 lb-in, and 60 lb-in, respectively. The respective output power for such motors may be 300 watts, 400 watts, 600 watts, and 800 watts. As should be apparent, however, other motor sizes can be employed without departing from the present disclosure.

Figure 4:
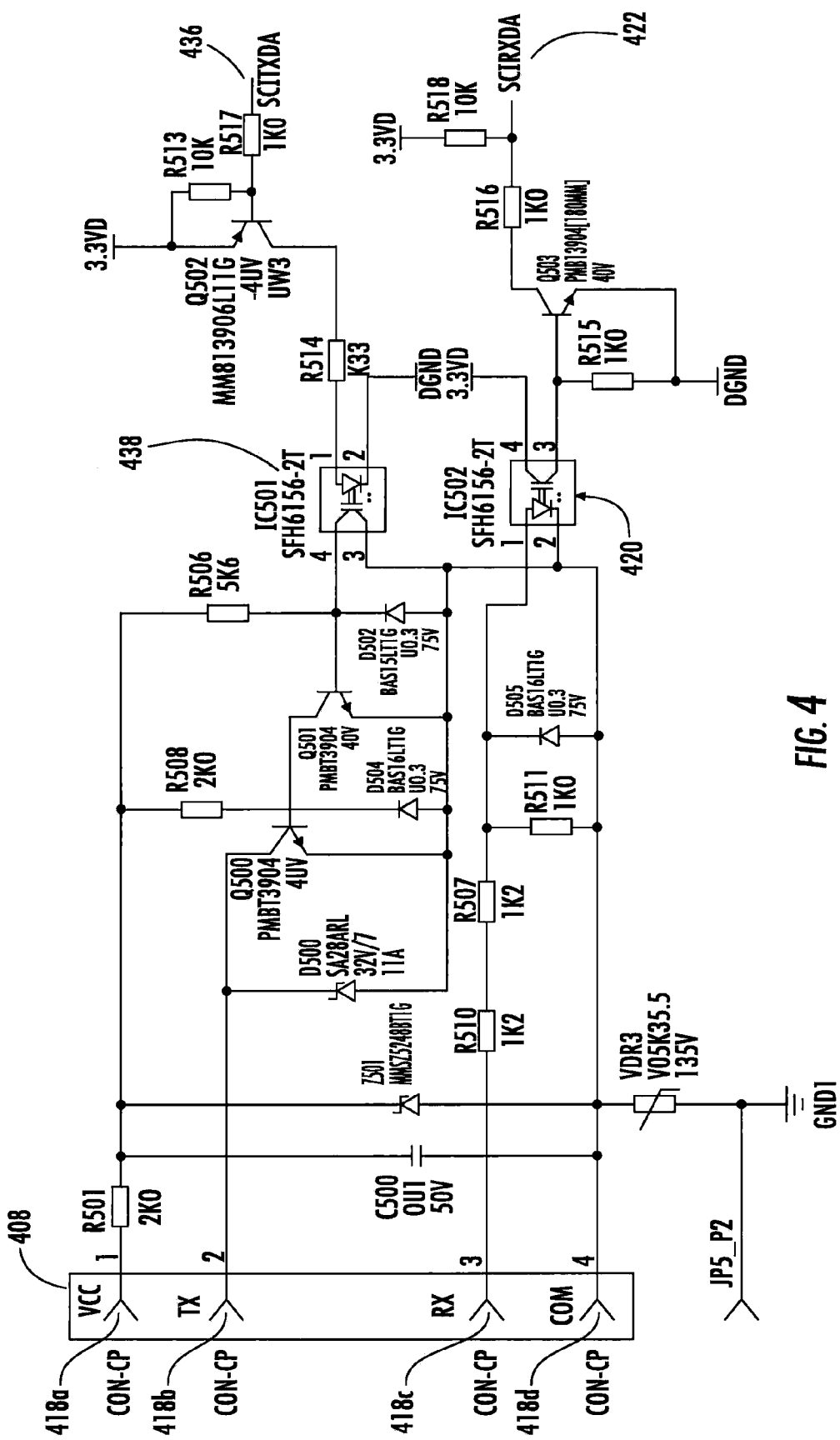
FIG. 4 is a circuit diagram of an input and an input/output coupling circuit suitable for use in a dynamoelectric machine assembly according to one or more aspects of the present disclosure.
Figure 5A:
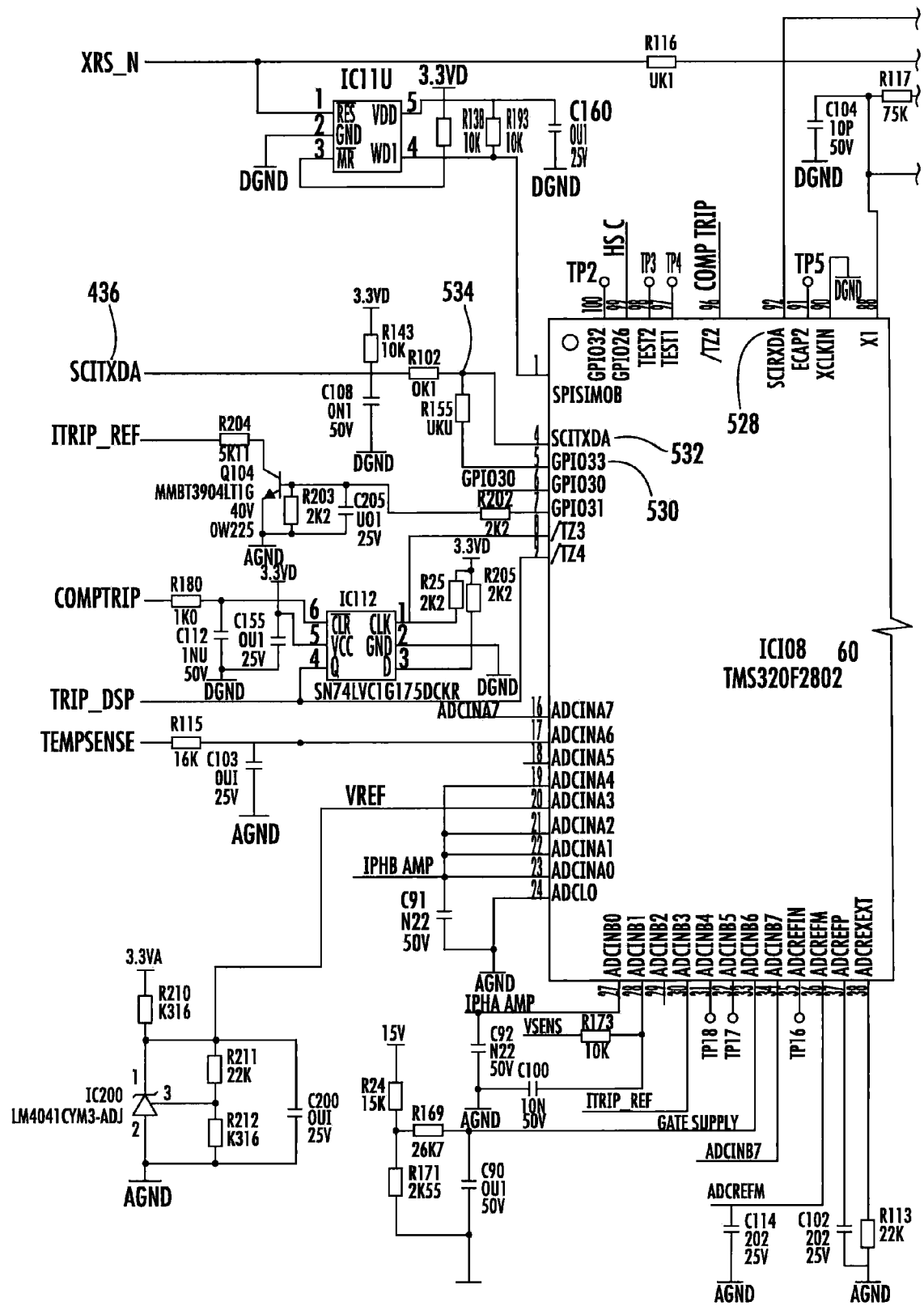
FIG. 5A is a portion of a circuit diagram of connections to a processor suitable for use in a dynamoelectric machine assembly according to one or more aspects of the present disclosure.
Figure 5B:
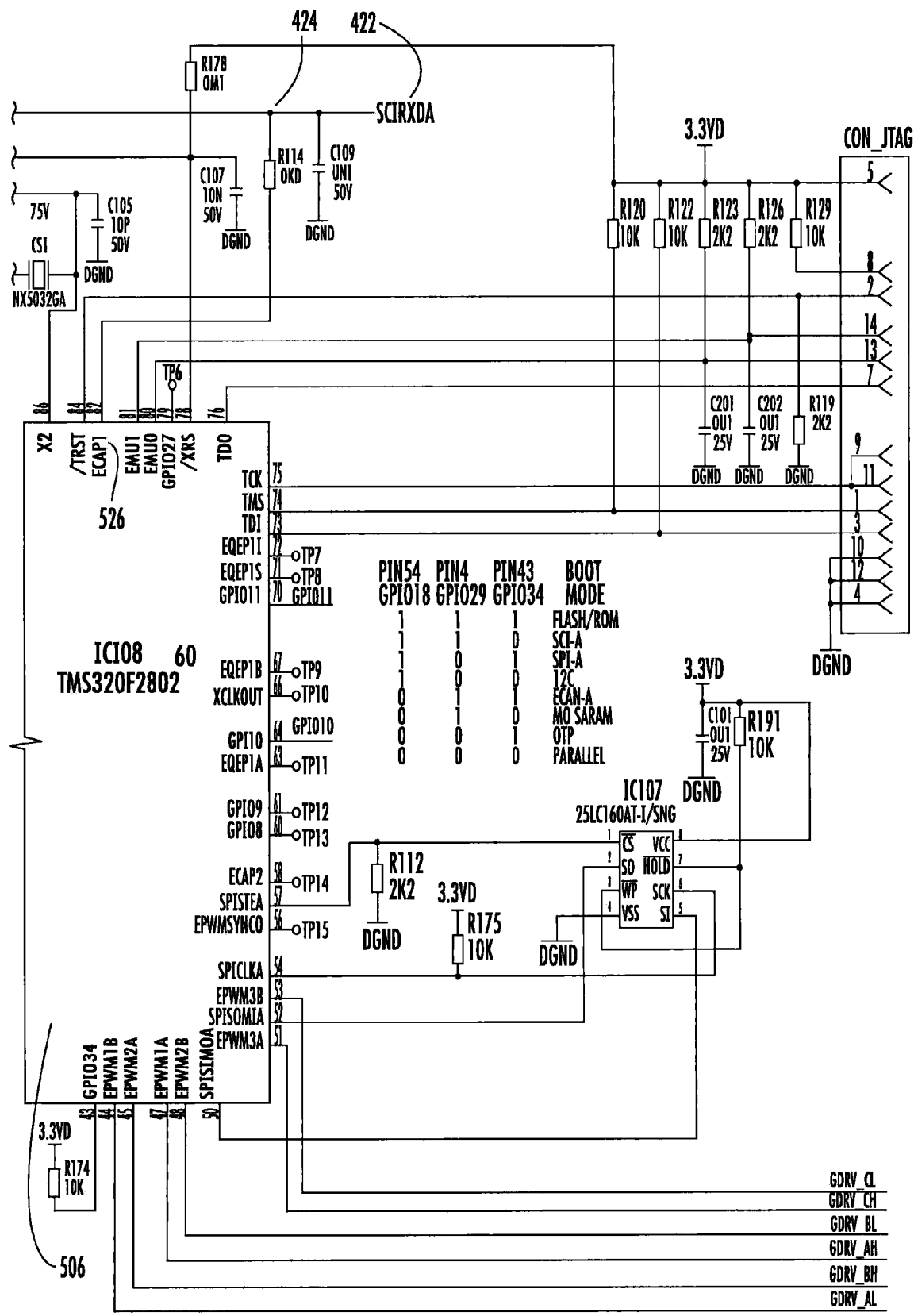
FIG. 5B is another portion of the circuit diagram in FIG. 5A.
Figure 6:
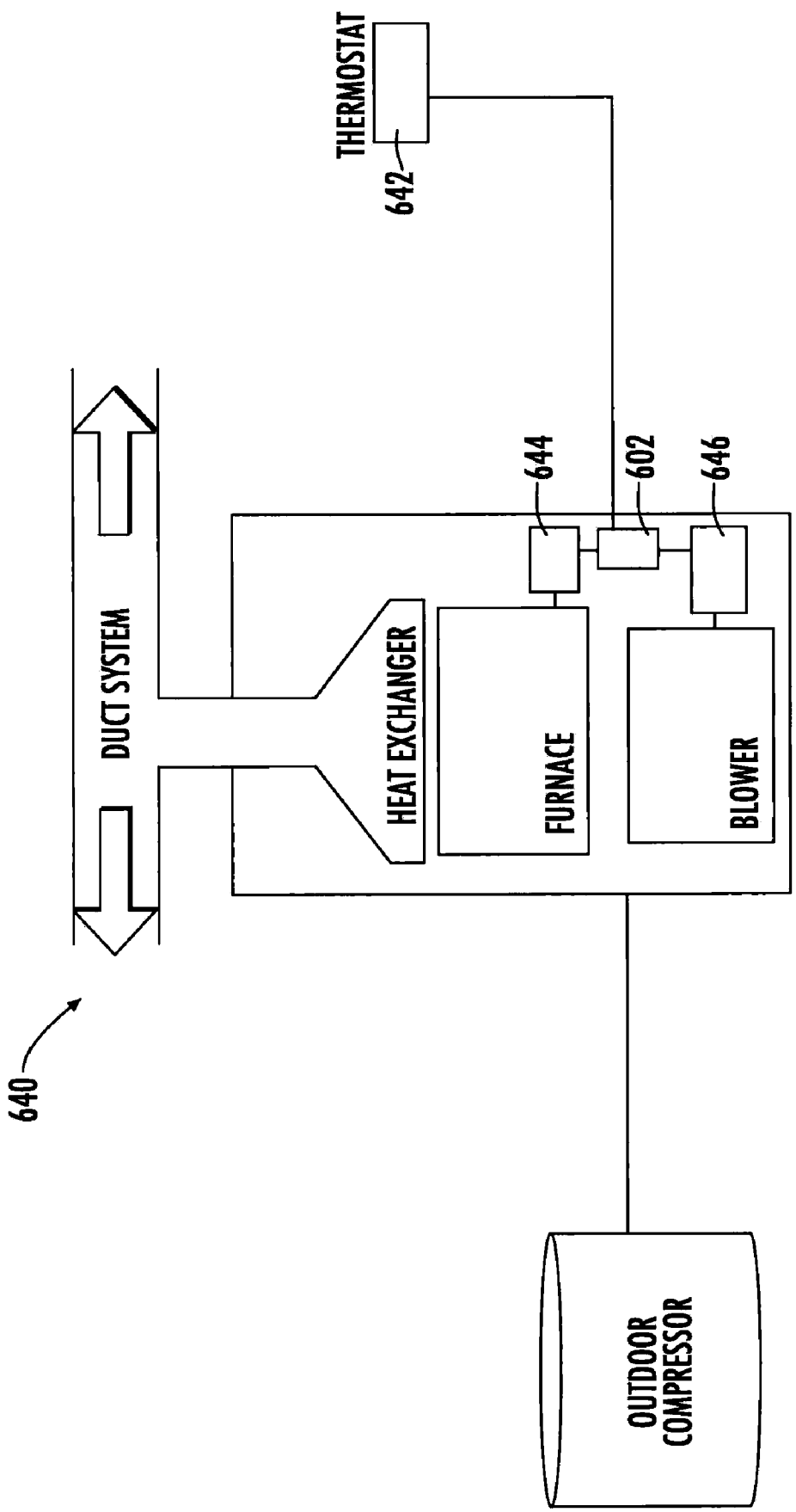
FIG. 6 is a block diagram of and HVAC system including one or more dynamoelectric machine assemblies according to one or more aspects of the present disclosure.

In the particular embodiments illustrated in FIGS. 4 and 5, the input 408 includes four contacts 418a-418d. The four contacts include a power contact 418a, an output contact 418b, an input contact 418c, and a common contact 418d (also sometimes known as a return or ground contact). A control signal is received at the input contact 418c regardless of whether the control signal is a PWM signal or a serial communication signal. The control signal is coupled, via optocoupler 420 to a processor such as the processor 506 in FIG. 5. For clarity, the connecting point along this path from FIG. 4 to FIG. 5 is identified as node 422 (which may simply be an arbitrary location along a wire or trace).

From node 422, the control signal is split at node 424 and provided to two different input pins of the processor 506. The two input pins are a capture pin 526 and a universal asynchronous receiver/transmitter (UART) pin 528. The capture pin 526 is generally used to handle PWM control signals, while the UART pin 528 handles serial communication signals.

The processor 506 is configured to determine whether the control signal received at the capture pin 526 and the UART pin 528 is a serial communication signal or a PWM signal. One way this can be achieved is by checking the frequency of the control signal. While the processor 506, and the overall assembly, can theoretically handle a PWM signal up to about 10 kHz, a PWM control signal frequency in the range of 100 Hz is more common and sufficient for most needs. At higher frequencies, minor noise in the control signal becomes more significant and more significantly affects the accuracy of control. Serial communication signals, however, are generally transmitted with a higher frequency than such PWM signals. For example, under some serial communication protocols, a baud rate of 4.8 kHz is specified. Thus, if the control signal has a frequency within the PWM frequency range, as may be indicated in the operating parameters, the processor 506 knows that the signal is a PWM signal. Confirmation that a signal is a serial communication signal can be similarly achieved using the specified serial communication baud rate.

Alternatively, or additionally, the processor 506 may determine whether a signal is a serial communication signal or a PWM signal based on the content of the signal. A PWM signal will generally have no meaning in a serial communication environment. In serial communications, usually a combination of a start bit, a stop bit, and parity bits are sent along with data bits. The start bit is typically sent first, followed by the data bits. Parity and stop bits may be sent after the data bits. Also, serial communication protocols usually employ checksum bits to check the validity of data transmitted and/or received. A PWM signal is distinguishable from, and will not appear the same as, such a serial communication signal. At best, if the PWM signal has a 50% duty cycle at exactly half the frequency of a serial communication protocol, the PWM signal will appear to be a repeating alternation of ones and zeros, and will not include distinct start, stop and parity bits. The processor 506 will quickly realize that such is not a valid serial communication signal and determine the signal is instead a PWM control signal.

Similar to the input pins 526 and 528, two outputs pins 530 and 532 of the processor 506 are connected together at a node 534. Output pin 530 is a general purpose input/output pin that is used by the processor to output an output signal when operating in PWM mode. Serial output pin 532 is an SCI transmit pin used to send a serial communication output signal when operating in serial mode. From node 534 the outputs are coupled, via an optocoupler 436, to the output contact 418b. Like node 422, node 436 connecting FIG. 5 and FIG. 4, is referenced for clarity only.

In other embodiments, such as the assembly 300 illustrated in FIG. 3, the input 308 includes n contacts 318a-318n, where n is an integer greater than 0. In such embodiments, the assembly may include two input contacts, for example 318c and 318e, and serial communication control signals and PWM control signals can be separately provided. For example, input contact 318c may be a PWM input contact for receiving only PWM control signals and being coupled to a capture pin of a processor. Input contact 318e may similarly be a serial input contact for receiving only serial communication signals and being coupled to a UART pin of a processor. In such an embodiment, the processor may determine whether the control signal is a PWM signal or a serial communication signal simply by determining on which input pin a signal has appeared. Similarly, output signals may utilize separate output pins and output contacts to transmit serial communication output signals and non-serial communication output signals.

Dynamoelectric machine assemblies according to the present disclosure can be used in many possible applications. For example, the assembly may be used in the HVAC system 640 illustrated in FIG. 6. The HVAC system 640 includes a thermostat 642 coupled to a system controller 602. The system controller 602 is coupled to a draft inducer motor assembly 644 and a blower motor assembly 646. The system controller is configured to control operation of the draft inducer motor assembly 644 and the blower motor assembly 646. Either or both of the draft inducer motor assembly 644 and the blower motor assembly 646 may be dynamoelectric machine assemblies according to the present disclosure. As such, the system controller 602 may control the assemblies 644, 646 with PWM control signals, serial communication control signals, or both types of signals. Dynamoelectric machine assemblies according to the present disclosure can also be used to drive a blower in a clothes dryer, a blower in a refrigeration system, a fan filter unit (FFU) for clean room applications, etc. The foregoing are simply some of the applications which may employ dynamoelectric machine assemblies according to the present disclosure and are presented as examples only. Numerous other applications may benefit from employing such assemblies as are disclosed herein.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed herein could be termed a second element, component, region, layer or section without departing from the teachings of the example embodiments.

What is claimed:

1. A dynamoelectric machine assembly for connection to a system controller, the assembly comprising:
   an input contact for receiving a control signal from the system controller;
   a processor coupled to the input contact, the processor configured to operate the assembly in a pulse width modulation (PWM) mode when the control signal is a PWM control signal and to operate the assembly in a serial mode when the control signal is a serial communication signal; and
   a four-contact connector for coupling the assembly to the system controller, the four-contact connector including said input contact, wherein the four-contact connector includes a first contact, a second contact, a third contact and a fourth contact, the first contact is the input contact, the second contact is an output contact for sending a data output signal from the assembly to the system controller, the third contact is a power input contact, and the fourth contact is a power return contact.

2. The assembly of claim 1 wherein the processor is configured to send the data output signal as a serial communication output signal when the assembly is operated in the serial mode.

3. The assembly of claim 1 wherein the processor is configured to send the data output signal as a PWM output signal representing an operating parameter of the assembly when the assembly is operated in the PWM mode.

4. The assembly of claim 1 wherein the processor is configured to send the data output signal as a variable frequency output signal representing an operating parameter of the assembly when the assembly is operated in the PWM mode.

5. The assembly of claim 1 wherein the processor is configured to operate in the PWM mode according to a plurality of operating parameters stored in memory.

6. The assembly of claim 5 wherein the processor is further configured to store in memory one or more operating parameters included in a serial communication signal received on the input contact.

7. The assembly of claim 1 wherein the processor includes a capture pin and a universal asynchronous receiver/transmitter (UART) pin, and the input contact is coupled to the UART pin and the capture pin to couple the control signal to the UART pin and the capture pin.

8. An HVAC system including the assembly of claim 7.

9. The HVAC system of claim 8 wherein the assembly drives one of a blower, a draft inducer, and a condenser fan.

10. A clean room fan filter unit (FFU) including the assembly of claim 7.

11. A clothes dryer including the assembly of claim 7.

12. A refrigeration system including a blower and the assembly of claim 7 for driving the blower.

* * * * *